US009259727B2

(12) United States Patent
Hsu et al.

(10) Patent No.: US 9,259,727 B2
(45) Date of Patent: Feb. 16, 2016

(54) METHOD OF MODIFYING NANO-POROUS GAS-REFORMING CATALYST WITH HIGH-TEMPERATURE STABILITY

(71) Applicant: Atomic Energy Council-Institute of Nuclear Research, Taoyuan County (TW)

(72) Inventors: Ning-Yih Hsu, Keelung (TW); King-Tsai Jeng, Taoyuan County (TW); Shean-Du Chiou, Taoyuan County (TW); Su-Hsine Lin, Taoyuan County (TW); Hwa-Yuan Tzeng, Taoyuan County (TW); Wan-Min Huang, Taoyuan County (TW); Yuan-Ming Chang, New Taipei (TW); Ruey-Yi Lee, Taoyuan County (TW)

(73) Assignee: Institute of Nuclear Energy Research, Atomic Energy Council, Executive Yuan, R.O.C., Lungtan, Taoyuan (TW)

( * ) Notice: Subject to any disclaimer, the term of this patent is extended or adjusted under 35 U.S.C. 154(b) by 685 days.

(21) Appl. No.: 13/657,996

(22) Filed: Oct. 23, 2012

(65) Prior Publication Data
US 2014/0113809 A1    Apr. 24, 2014

(51) Int. Cl.
| | | |
|---|---|---|
| B01J 23/10 | (2006.01) |
| B01J 23/42 | (2006.01) |
| B01J 23/44 | (2006.01) |
| B01J 37/00 | (2006.01) |
| B01J 23/63 | (2006.01) |
| B01J 21/04 | (2006.01) |
| B01J 21/18 | (2006.01) |
| B01J 35/02 | (2006.01) |
| B01J 35/10 | (2006.01) |
| B01J 37/02 | (2006.01) |
| B82Y 40/00 | (2011.01) |

(52) U.S. Cl.
CPC .............. *B01J 37/0018* (2013.01); *B01J 21/04* (2013.01); *B01J 21/185* (2013.01); *B01J 23/63* (2013.01); *B01J 35/023* (2013.01); *B01J 35/026* (2013.01); *B01J 35/1061* (2013.01); *B01J 35/1066* (2013.01); *B01J 37/0036* (2013.01); *B01J 37/0063* (2013.01); *B01J 37/0201* (2013.01); *B82Y 40/00* (2013.01)

(58) Field of Classification Search
None
See application file for complete search history.

(56) References Cited

U.S. PATENT DOCUMENTS

| | | | | |
|---|---|---|---|---|
| 2003/0151155 A1* | 8/2003 | Muroi | ............... | C04B 35/195 264/44 |
| 2010/0004120 A1* | 1/2010 | Kwak | ............... | B01D 53/865 502/151 |

FOREIGN PATENT DOCUMENTS

JP        2005263537 A  *  9/2005  ............. C04B 38/00

\* cited by examiner

*Primary Examiner* — Melvin C Mayes
*Assistant Examiner* — Michael Forrest
(74) *Attorney, Agent, or Firm* — Jackson IPG PLLC; Demian K. Jackson

(57) ABSTRACT

A gas-reforming catalyst is modified to obtain stability in high temperature. The catalyst uses $\alpha$-$Al_2O_3$ as a carrier and is nano-porous. Hence, reaction surface is greatly broadened; and platinum contained inside does not become bigger after times of use. The catalyst does not deposit carbon and has long life. The stability of the catalyst can be still remained even at a temperature higher than 800° C.

8 Claims, 6 Drawing Sheets

METHOD OF MODIFYING NANO-POROUS GAS-REFORMING CATALYST WITH HIGH-TEMPERATURE STABILITY

TECHNICAL FIELD OF THE INVENTION

The present invention relates to a reforming catalyst; more particularly, relates to using an α-aluminum oxide (α-$Al_2O_3$) carrier to fabricate a reforming catalyst of Pt (platinum)/$CeO_2$ (cerium oxide)/α-$Al_2O_3$ (α-aluminum oxide), where the Pt and $CeO_2$ are formed on the α-$Al_2O_3$ carrier in nano-pores of the Pt/$CeO_2$/α-$Al_2O_3$ catalyst.

DESCRIPTION OF THE RELATED ARTS

As oil price is rising and earth protection is urgent, new and green energy sources are required. Solid oxide fuel cell (SOFC) is one of the solutions for its high efficiency and low carbon oxide discharge. Therein, hydrogen reformer for natural gas is a key issue on developing SOFC. However, a nickel (Ni)-based catalyst used for the reformer has problems of pulverization and carbon deposition after reforming reaction.

The nickel-based catalyst is used owing to two reasons. The nickel metal can absorb methane and release hydrogen atoms to form hydrogen gas. Secondly, the nickel-based catalyst is cheap. The nickel-based catalyst is fabricated through deposition, co-deposition or impregnation. The nickel-based catalysts fabricated through deposition and co-deposition have complex procedures for spreading on the carriers uniformly. Hence, impregnation is a common method for fabricating the nickel-based catalyst. The nickel-based catalyst achieves a good performance on aluminum oxide ($Al_2O_3$). Yet, bulk-Ni may be formed when the nickel carrier is dense, and the bulk-Ni does not react with the carrier. The bulk-Ni may be easily gathered and sintered to make the catalyst inactive. If no bulk-Ni exists in the catalyst, the more Ni is contained in the catalyst, the better performance is the catalyst. Besides, when more Ni is contained, more hydrogen is consumed and there are more linking effect between hydrogen and aluminum oxide. Thus, distribution of Ni on the catalyst is better; the catalyst will not be easily sintered; and, production of hydrogen is higher. However, after 200 hrs of running, dust is found to choke channels of SOFC while the reformer still functions well. Nevertheless, after processing the reforming reaction at a high temperature (~800° C.), the catalyst is pulverized.

Generally speaking, there are some points to consider on choosing a carrier, including specific surface (relating to distribution of active points), porosity (relating to mass transfer and heat transfer), granular size (relating to voltage drop), mechanical strength, etc. Aluminum oxide is one of the most commonly used carriers for a catalyst. But, nickel oxide (NiO) is easily reacted with γ-$Al_2O_3$ in a high-temperature oxidant environment to form an inactive $NiAl_2O_4$, which can not be easily reducted.

A new catalyst, α-$Al_2O_3$, is used as a carrier for having better hardness. In 1987, Yu-Yao found that, even through precious metal on the carrier may gather, transition metal or rare-earth oxide can be added to reduce usage amount of the precious metal and to increase surface of the carrier for uniformly distribute atoms or ions of the precious metal on the surface of the carrier. Therein, cerium oxide ($CeO_2$) is a promoter having a good performance, which forms a Pt—$CeO_2$ complex structure. Besides, $CeO_2$ stores oxygen itself for processing oxidation; and, therefore, activity of the whole catalyst is greatly enhanced. In addition, carbon deposition can be reduced by adding Pt. However, the Pt—$CeO_2$ structure is only a non-organic membrane on the surface without pores formed inside. The surface for reaction is small and Pt will become bigger after times of use. Not to mention that, because the Pt—$CeO_2$ structure is only formed on the surface, stability of the catalyst used at high temperature is not good. Hence, the prior arts do not fulfill all users' requests on actual use.

SUMMARY OF THE INVENTION

The main purpose of the present invention is to use an α-$Al_2O_3$ carrier for fabricating a nano-porous Pt/$CeO_2$/α-$Al_2O_3$ catalyst, where Pt and $CeO_2$ are formed on the carrier in nano-pores of the catalyst; the catalyst has expanded surface and, with the nano-pores, Pt does not become bigger as being sintered at a temperature higher than 800° C.

Another purpose of the present invention is to provide a reforming catalyst for natural gas, which catalyst has a hydrogen producing rate about 67%, a conversion rate higher than 95% and stability on running for 1000 hrs without being pulverized or carbon-deposited.

To achieve the above purposes, the present invention is a method of modifying a nano-porous gas-reforming catalyst with high-temperature stability, comprising steps of: (a) obtaining γ-$Al_2O_3$ to be added with active carbon or a carbon nanomaterial; then, mixing γ-$Al_2O_3$ and the carbon material through ball milling to be tableted to obtain a cylinder of γ-$Al_2O_3$ having nano-pores; (b) putting the cylinder of γ-$Al_2O_3$ having nano-pores into a furnace flown with air to be calcined for 6~9 hours (hrs) at a temperature-rising velocity of 5° C. per minute (° C./min) until a temperature of 1080~1320 Celsius degrees (° C.); then, lowering down the temperature to a room temperature at a temperature-falling velocity of 5° C./min to obtain a cylinder of α-$Al_2O_3$ having nano-pores; (c) obtaining cerium nitrate ($Ce(NO_3)_3.6H_2O$) to be dissolved into deionized water to obtain a solution of cerium nitrate; (d) impregnating the cylinder of α-$Al_2O_3$ having nano-pores in the solution of cerium nitrate; (e) draining left-over water from the solution of cerium nitrate impregnated with the cylinder of α-$Al_2O_3$ having nano-pores by using a vacuum evaporator to obtain a catalyst; (f) putting the catalyst in an oven to be dried, where the catalyst is a $CeO_2$/α-$Al_2O_3$ catalyst and $CeO_2$ is a carrier on α-$Al_2O_3$ to be embedded in the nano-pores; (g) putting the dried $CeO_2$/α-$Al_2O_3$ catalyst in a furnace flown with air to be calcined for 3~5 hrs with a temperature-rising velocity of 5° C./min until a temperature of 440~660° C.; (h) obtaining chloroplatinic acid to be dissolved into deionized water to obtain a solution of platinum; (i) impregnating the calcined $CeO_2$/α-$Al_2O_3$ catalyst in the solution of platinum; (j) draining left-over water from the solution of platinum impregnated with the $CeO_2$/α-$Al_2O_3$ catalyst by using a vacuum evaporator and drying the drained catalyst in an oven; and (k) putting the dried catalyst in a furnace flown with air to be calcined for ~5 hrs with a temperature-rising velocity of 5° C./min until a temperature of 520~780° C.; then, lowering down the temperature to a room temperature at a temperature-falling velocity of 5° C./min to obtain a Pt/$CeO_2$/α-$Al_2O_3$ catalyst having nano-pores, where Pt and $CeO_2$ are located on α-$Al_2O_3$ to be embedded in the nano-pores. Accordingly, a novel method of modifying a nano-porous gas-reforming catalyst with high-temperature stability is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the flow view showing the preferred embodiment according to the present invention;

DESCRIPTION OF THE PREFERRED EMBODIMENT

The following description of the preferred embodiment is provided to understand the features and the structures of the present invention.

Figure 1:
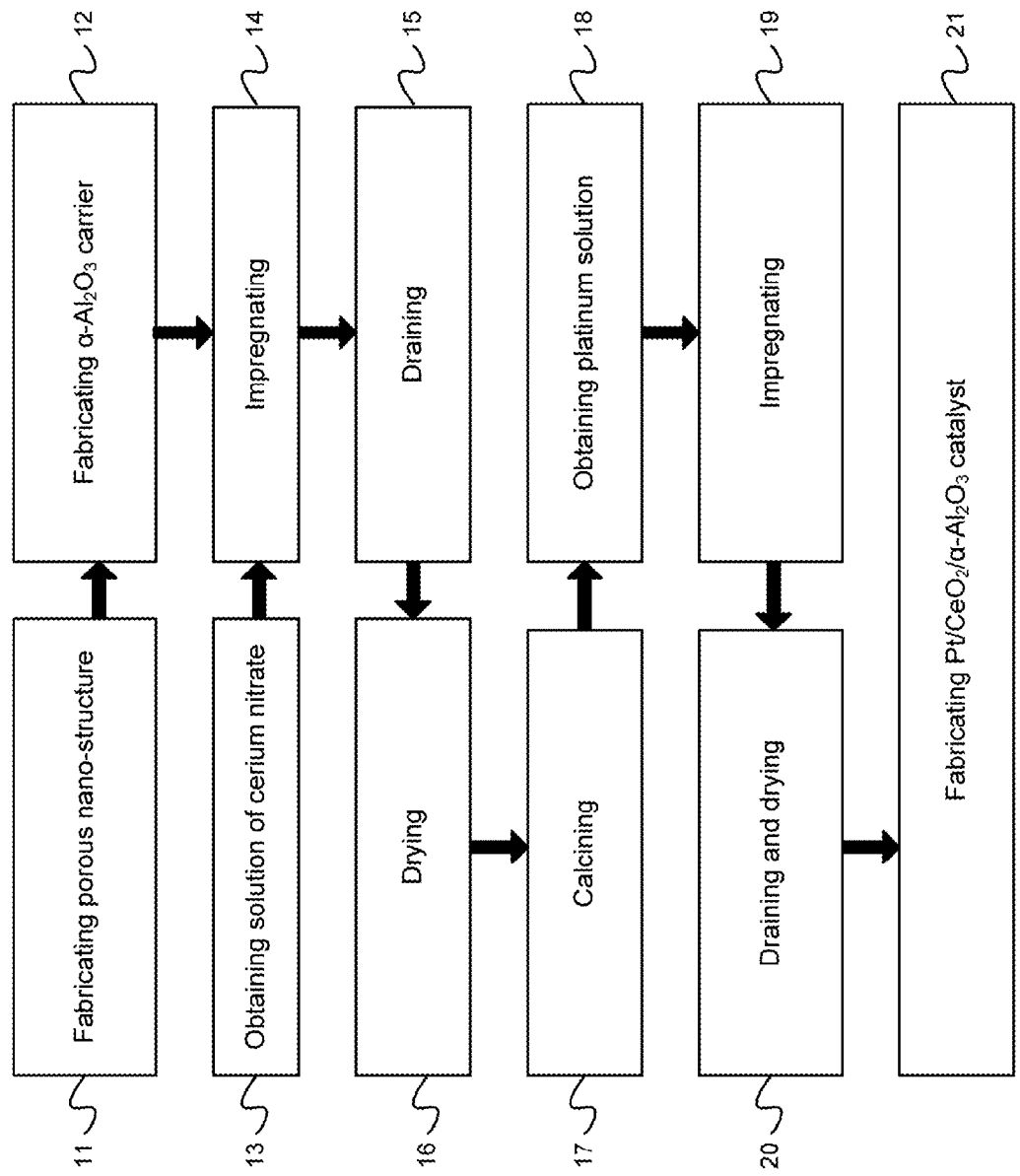
Figure 2:
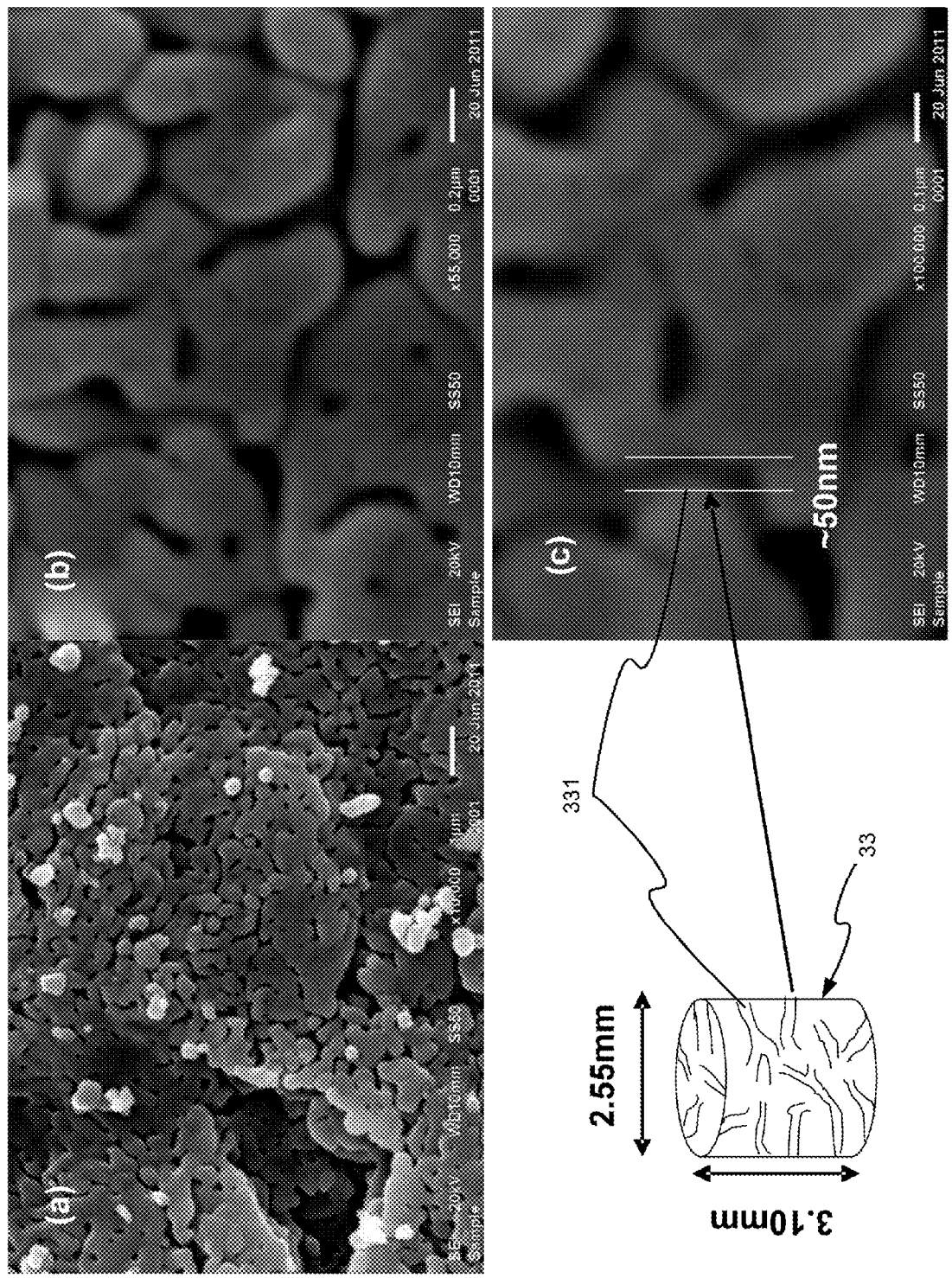
FIG. 2 is the view showing the α-$Al_2O_3$ carrier.

Please refer to FIG. 1 and FIG. 2, which are a flow view showing the preferred embodiment according to the present invention and a view showing an α-$Al_2O_3$ carrier. As shown in the figures, the present invention is a method of modifying a nano-porous gas-reforming catalyst with high-temperature stability, comprising the following steps:

(a) Fabricating porous nano-structure 11: At first, γ-aluminum oxide (γ-$Al_2O_3$) is obtained to be added with a carbon material of active carbon or a carbon nanotube (CNT). Then, γ-Al2O3 and the carbon material or CNT are mixed through ball milling to be tableted for forming a cylinder of γ-$Al_2O_3$ having nano-pores.

(b) Fabricating α-$Al_2O_3$ carrier 12: The cylinder of γ-$Al_2O_3$ having nano-pores is put into a furnace flown with 3 liters per minute (LPM) of air to be calcined for 8 hours (hrs) at a temperature-rising velocity of 5° C. per minute (° C./min) until a temperature of 1200 Celsius degrees (° C.). Then, the temperature is lowered down to a room temperature at a temperature-falling velocity of 5° C./min to obtain a cylinder of α-$Al_2O_3$ having nano-pores. In FIG. 2, the cylinder of α-$Al_2O_3$ 33 has a granular size of 2.55 millimeters (mm) and a height of 3.10 mm and has nano-pores having a diameter of 50 nanometers (nm).

(c) Obtaining solution of cerium nitrate 13: 18.6 grams (g) of cerium nitrate ($Ce(NO_3)_3 \cdot 6H_2O$) is obtained to be dissolved into 50 g of deionized water to obtain a solution of cerium nitrate.

(d) Impregnating 14: 40 g of the cylinder of α-$Al_2O_3$ having nano-pores is impregnated in the solution of cerium nitrate for 12 hrs.

(e) Draining 15: Left-over water is drained from the solution of cerium nitrate impregnated with the cylinder of α-$Al_2O_3$ having nano-pores by using a vacuum evaporator to obtain a catalyst.

(f) Drying 16: The drained catalyst is put in an oven to be dried at a temperature of 110° C., where the catalyst is a $CeO_2$ (cerium oxide)/α-$Al_2O_3$ catalyst and $CeO_2$ is a carrier on α-$Al_2O_3$ to be embedded in the nano-pores.

(g) Calcining 17: The dried $CeO_2$/α-$Al_2O_3$ catalyst is put in a furnace flown with 3 liters per minute (LPM) of air to be calcined for 4 hrs with a temperature-rising velocity of 5° C./min until a temperature of 550° C.

(h) Obtaining platinum solution 18: 21.25 g of chloroplatinic acid is obtained to be dissolved into 50 g of deionized water to obtain a solution of platinum.

(i) Impregnating 19: 40 g of the calcined $CeO_2$/α-$Al_2O_3$ catalyst in step (f) is impregnated in the solution of platinum for 12 hrs.

(j) Draining and drying 20: left-over water is drained from the solution of platinum impregnated with the $CeO_2$/α-$Al_2O_3$ catalyst by using a vacuum evaporator. After draining, the catalyst is dried in an oven at a temperature of 110° C. for 24 hrs.

(k) Fabricating Pt/$CeO_2$/α-$Al_2O_3$ catalyst 21: The dried catalyst is put in a furnace flown with 3LPM of air to be calcined for 4 hrs with a temperature-rising velocity of 5° C./min until a temperature of 650° C. Then, the temperature is lowered down to a room temperature at a temperature-falling velocity of 5° C./min. Thus, a Pt/$CeO_2$/α-$Al_2O_3$ catalyst having nano-pores is fabricated, where Pt and $CeO_2$ are located on α-Al2O3 to be embedded in the nano-pores.

Figure 3:
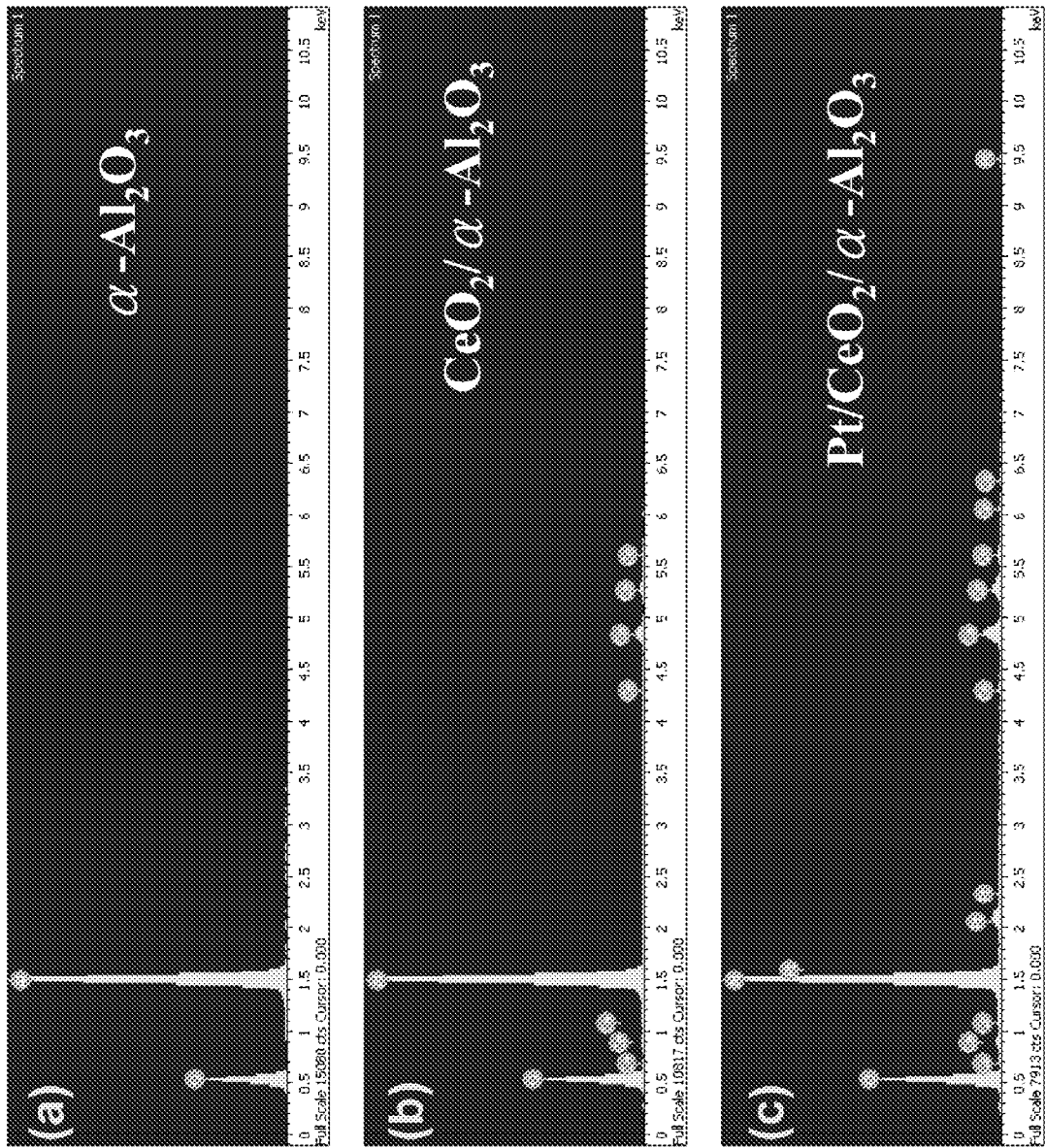
FIG. 3 is the view showing the crystalline phases of the carriers and the final catalyst.

Please refer to FIG. 3, which is a view showing crystalline phases of carriers and a final catalyst. As shown in the figure, crystalline phases of catalysts are shown through energy-dispersive X-ray spectroscopy (EDS). Diagram (a) in the figure shows an α-$Al_2O_3$ catalyst; diagram (b) shows a $CeO_2$/α-$Al_2O_3$ catalyst; and diagram (c) shows a Pt/$CeO_2$/α-$Al_2O_3$ catalyst. All shows the same good characteristic peak, which means a good crystalline structure.

Figure 4:
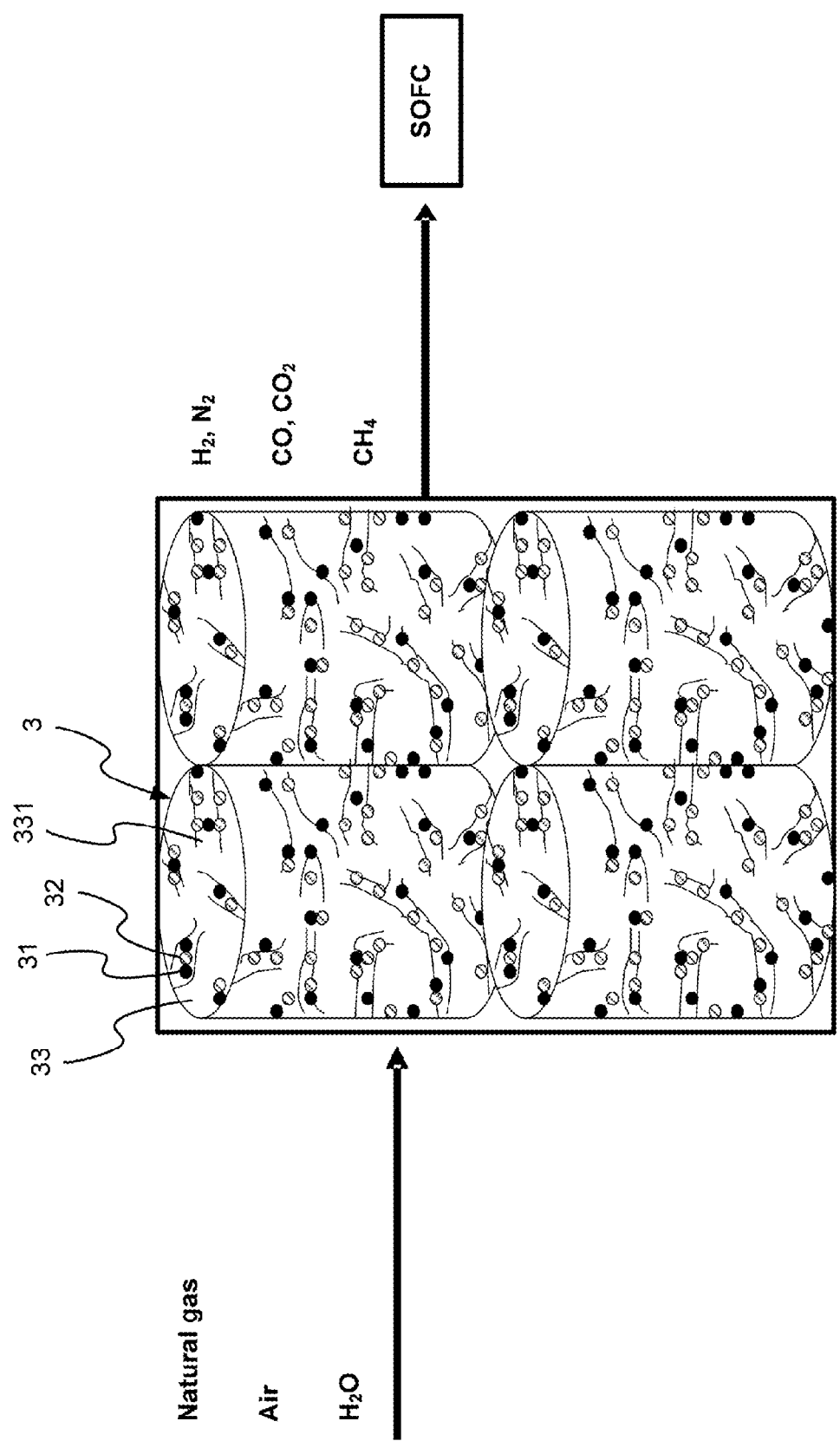
FIG. 4 is the view showing the reforming process of the catalyst.
Figure 5:
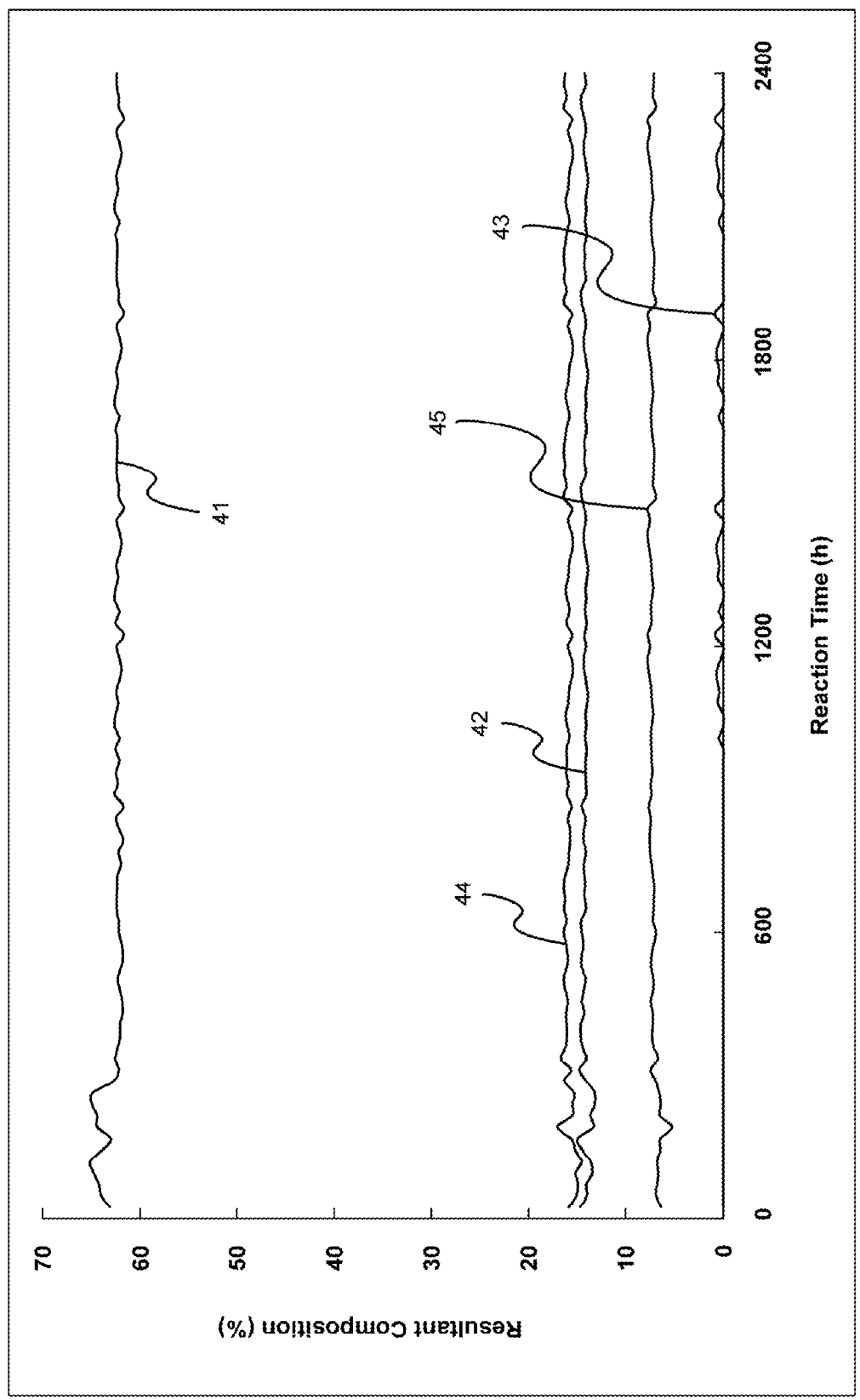
FIG. 5 is the view showing the resultant compositions after the reforming process.
Figure 6:
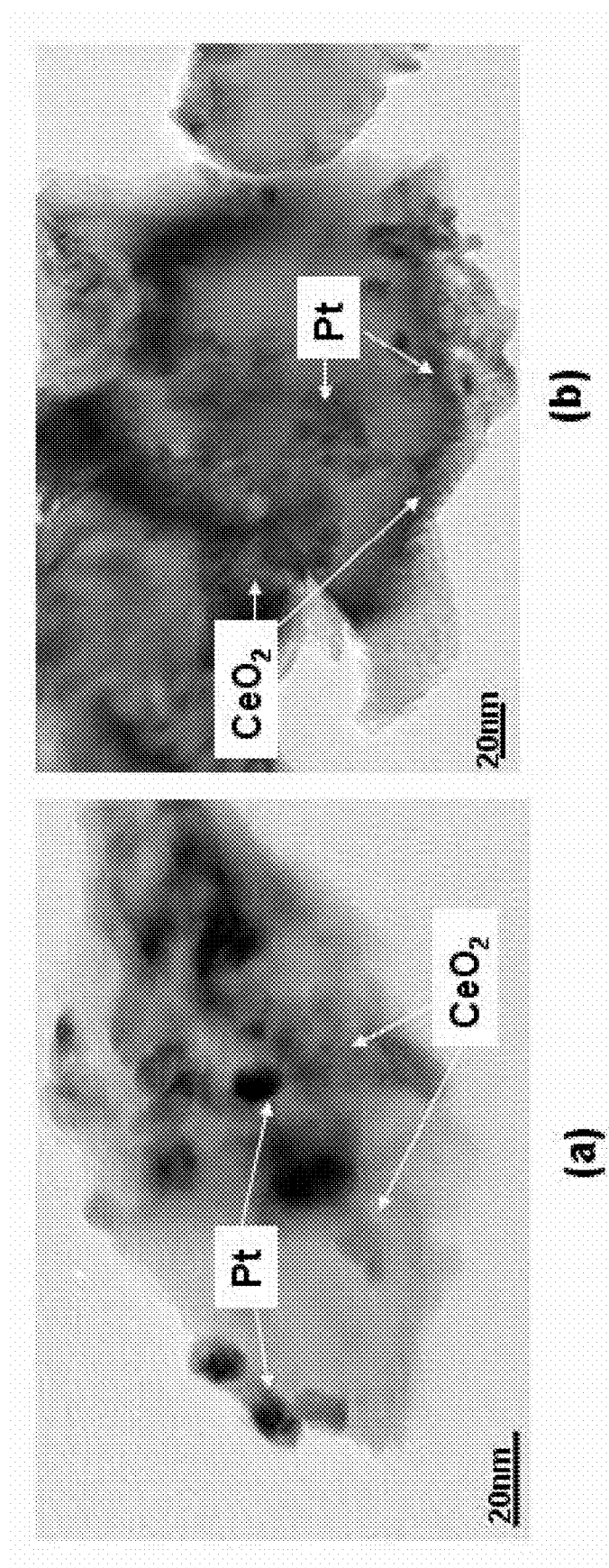
FIG. 6 is the view showing the changes in the micro-structures before and after the stability test.

Please refer to FIG. 4 to FIG. 6, which are a view showing a reforming process of catalyst, a view showing resultant compositions after the reforming process and a view showing changes in micro-structures before and after stability test. As shown in the figures, a metal of Pt and a material of $CeO_2$ 32 are used to form a reforming catalyst 3 on an α-$Al_2O_3$ carrier 33 with nano-pores 331.

For stability test, a reforming reaction is processed through auto-thermal reaction with reactants of natural gas, air and water ($H_2O$). After mixing the reactants, the reforming catalyst is used to process a high-temperature reforming reaction for generating hydrogen and, thus, a hydrogen-rich gas is provided for a solid oxide fuel cell (SOFC). Although α-$Al_2O_3$ carrier used in the Pt/$CeO_2$/α-$Al_2O_3$ catalyst has low ratio of surface area, the carrier has irregular shape and Pt and $CeO_2$ are formed in nano-pores to increase reaction surface and residence time. In FIG. 5, a hydrogen density curve 41 reaches 66.57% with a nitrogen density curve 42 reaching 11.31%, a carbon monoxide (CO) density curve 44 reaching 15.48% and a carbon dioxide ($CO_2$) density curve 45 reaching 6%, which shows the production rate of hydrogen is more than 65%. After the reforming reaction of the Pt/$CeO_2$/α-$Al_2O_3$ catalyst, a methane ($CH_4$) density curve 43 shows that almost no methane is produced, which indicates a good activity of the Pt/$CeO_2$/α-$Al_2O_3$ catalyst on generating hydrogen from natural gas. In FIG. 6, diagram (a) and diagram (b) are the micro-structures of the reforming catalyst 3 before and after 2000 hrs of stability test. After the 2000 hrs of stability test, the reforming catalyst 3 shows its ability on resisting tens of times of 800° C. thermal cycling in SOFC without being pulverized or carbon-deposited.

Thus, the present invention uses an α-$Al_2O_3$ carrier to fabricate a reforming catalyst of Pt/$CeO_2$/α-$Al_2O_3$, where Pt and $CeO_2$ are formed on the α-$Al_2O_3$ carrier in nano-pores of the Pt/$CeO_2$/α-$Al_2O_3$ catalyst. The Pt/$CeO_2$/α-$Al_2O_3$ catalyst fabricated according to the present invention has increased reaction surface and is prevented from moving and gathering of metal crystallite. The catalyst reaches a hydrogen producing rate about 67%, a conversion rate higher than 95% and stability on running even for 2000 hrs. In addition, with the nano-pores, interaction between Pt and $CeO_2$ is reduced through surface expansion for further restraining sintering of Pt and keeping Pt small while stability is still remained at a temperature higher than 800° C.

To sum up, the present invention is a method of modifying a nano-porous gas-reforming catalyst with high-temperature stability, where a thermo-resistant and nano-porous α-$Al_2O_3$ carrier is used for fabricating a Pt/$CeO_2$/α-$Al_2O_3$ catalyst; Pt and $CeO_2$ are formed on the carrier in nano-pores of the catalyst; the catalyst has expanded surface and a good hydrogen conversion rate; the catalyst does not pulverized or carbon-deposited under a temperature higher than 800° C. with stability on running even for 2000 hrs; and, with the nano-pores, Pt does not become bigger through being sintered.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of forming a nano-porous gas-reforming catalyst with high-temperature stability, comprising steps of:
   (a) adding γ-aluminum oxide (γ-$Al_2O_3$) with a carbon material selected from a group consisting of active carbon and a carbon nanomaterial; then, mixing the γ-$Al_2O_3$ and said carbon material through ball milling and tableting the ball milled mixture to obtain a cylinder of γ-$Al_2O_3$ having nano-pores;
   (b) calcining said cylinder of γ-$Al_2O_3$ having nano-pores in a furnace flown with air for 6~9 hours (hrs) at a temperature-rising velocity of 5° C. per minute (° C./min) until a temperature of 1080~1320 Celsius degrees (° C.); then, lowering down said temperature to a room temperature at a temperature-falling velocity of 5° C./min to obtain a cylinder of α-$Al_2O_3$ having nano-pores;
   (c) dissolving cerium nitrate (Ce($NO_3$)$_3$.6$H_2O$) into deionized water to obtain a solution of cerium nitrate;
   (d) impregnating said cylinder of α-$Al_2O_3$ having nano-pores in said solution of cerium nitrate;
   (e) draining left-over water from said solution of cerium nitrate by using a vacuum evaporator to obtain a catalyst impregnated cylinder of α-$Al_2O_3$ having nano-pores;
   (f) drying said catalyst impregnated cylinder of α-$Al_2O_3$ having nano-pores in an oven, wherein said catalyst is a $CeO_2$/α-$Al_2O_3$ catalyst and $CeO_2$ is carried on the cylinder of α-$Al_2O_3$ and embedded in said nano-pores;
   (g) calcining said dried $CeO_2$/α-$Al_2O_3$ catalyst in a furnace flown with air for 3~5 hrs with a temperature-rising velocity of 5° C./min until a temperature of 440~660° C.;
   (h) dissolving chloroplatinic acid into deionized water to obtain a solution of platinum;
   (i) impregnating said calcined $CeO_2$/α-$Al_2O_3$ catalyst in said solution of platinum so as to form a platinum impregnated Pt/$CeO_2$/α-$Al_2O_3$ catalyst;
   (j) draining left-over water from said solution of platinum by using a vacuum evaporator and drying said drained Pt/$CeO_2$/α-$Al_2O_3$ catalyst in an oven; and
   (k) calcining said dried Pt/$CeO_2$/α-$Al_2O_3$ catalyst in a furnace flown with air for ~5 hrs with a temperature-rising velocity of 5° C./min until a temperature of 520~780° C.; then, lowering down said temperature to a room temperature at a temperature-falling velocity of 5° C./min to obtain a calcined Pt/$CeO_2$/α-$Al_2O_3$ catalyst having nano-pores, wherein Pt and $CeO_2$ are located on α-$Al_2O_3$ embedded in said nano-pores; and wherein said Pt/$CeO_2$/α-$Al_2O_3$ catalyst has a durability longer than 2000 hrs, a gas conversion rate higher than 95 percent (%) and stability at a temperature higher than 1000° C.

2. The method according to claim 1, wherein said carbon nanomaterial is a carbon nanotube (CNT).

3. The method according to claim 1, wherein, in step (b), said α-$Al_2O_3$ catalyst is a cylinder having a granular size of 2.04~3.06 millimeters (mm) and a height of 2.48~3.72 mm and has nano-pores having diameters of 60~40 nanometers (nm).

4. The method according to claim 1, wherein, in step (b), 3 liters per minute (LPM) of air is flown in to process calcination for 8 hrs with a temperature-rising velocity of 5° C./min until 1200° C.

5. The method according to claim 1, wherein, in step (d), said impregnating is processed for 12 hrs.

6. The method according to claim 1, wherein, in step (g), 3LPM of air is flown in to process calcination for 4 hrs with a temperature-rising velocity of 5° C./min until 550° C.

7. The method according to claim 1, wherein, in step (i), said impregnating is processed for 12 hrs.

8. The method according to claim 1, wherein, in step (k), 3LPM of air is flown in to process calcination for 4 hrs with a temperature-rising velocity of 5° C./min until 650° C.

* * * * *